United States Patent
Hopper et al.

[11] Patent Number: 6,070,913
[45] Date of Patent: Jun. 6, 2000

[54] RELEASABLE SELF-LOCKING CLIP ARRANGEMENT INTERFACING WITH THREADED CONNECTION BETWEEN PLUG BODY AND TUBULAR SHROUD OF ELECTRICAL CONNECTOR PLUG HOUSING

[75] Inventors: Douglas A. Hopper, Maryville, Ill.; Michael W. Miller, St. Louis, Mo.

[73] Assignee: Hubbel Incorporated, Orange, Conn.

[21] Appl. No.: 09/032,816

[22] Filed: Mar. 2, 1998

[51] Int. Cl.[7] .................................................. F16J 15/00
[52] U.S. Cl. ............................ 285/92; 285/81; 285/87; 411/120; 411/121
[58] Field of Search ........................ 285/87, 92, 81, 285/88; 439/321, 318; 411/299, 941.1, 120, 121

[56] References Cited

U.S. PATENT DOCUMENTS

| | | |
|---|---|---|
| 673,572 | 5/1901 | Barrow ........................ 285/92 |
| 825,354 | 7/1906 | Schnoor ...................... 285/87 |
| 873,892 | 12/1907 | Petterson .................... 285/87 |
| 875,004 | 12/1907 | Shears ........................ 285/87 |
| 981,866 | 1/1911 | Lockhart ..................... 285/87 |
| 1,038,948 | 9/1912 | Patrick ........................ 285/87 |
| 1,047,542 | 12/1912 | Lofland . | |
| 1,387,172 | 8/1921 | Postel . | |
| 1,679,474 | 8/1928 | Kenton . | |
| 1,914,736 | 6/1933 | Coutu ......................... 285/92 |
| 2,735,992 | 2/1956 | Bailey ......................... 339/91 |
| 2,784,385 | 3/1957 | Ennis .......................... 339/89 |
| 2,890,434 | 6/1959 | Ray et al. .................... 339/91 |
| 3,639,950 | 2/1972 | Lutz et al. ................... 24/230 |
| 3,984,168 | 10/1976 | Korman ...................... 339/103 C |
| 4,053,198 | 10/1977 | Doyle et al. ................. 339/103 R |
| 4,191,443 | 3/1980 | Doyle .......................... 339/103 R |
| 4,548,458 | 10/1985 | Gallusser et al. ........... 339/89 R |
| 4,616,856 | 10/1986 | Kowalyshen ................ 285/92 |
| 4,740,175 | 4/1988 | Marks et al. ................. 439/589 |
| 4,834,667 | 5/1989 | Fowler et al. ............... 439/321 |
| 4,846,508 | 7/1989 | Pallini, Jr. et al. .......... 285/92 |
| 5,145,394 | 9/1992 | Hager .......................... 439/321 |
| 5,188,398 | 2/1993 | Parimore, Jr. et al. ....... 285/92 |
| 5,192,219 | 3/1993 | Fowler et al. ............... 439/321 |
| 5,350,200 | 9/1994 | Peterson et al. ............. 285/92 |
| 5,449,302 | 9/1995 | Yarbrough et al. .......... 439/680 |

FOREIGN PATENT DOCUMENTS

| | | | |
|---|---|---|---|
| 241568 | 3/1960 | Australia ................ | 285/87 |
| 450352 | 1/1913 | France ................... | 285/87 |
| 214959 | 9/1924 | United Kingdom .... | 285/87 |

*Primary Examiner*—Eric K. Nicholson
*Attorney, Agent, or Firm*—Jerry M. Presson; Michael R. Swartz

[57] ABSTRACT

A connector plug housing for an electrical connector assembly includes a plug body having a male end, a tubular shroud having a female end adapted to be received on the male end of the plug body, first and second complementary threads respectively formed on the male end of the plug body and the female end of the tubular shroud for providing a threaded connection therebetween by screwing the female end of the tubular shroud relative to and on the male end of the plug body, and a releasable self-locking clip arrangement provided on the plug body and tubular shroud in an interfacing relationship with the first and second threads thereon. The self-locking clip arrangement includes an elongated resiliently deformable spring clip actuatable between an outward relaxed condition and an inward depressed condition such that locking of the tubular shroud on the plug body is accomplished solely by screwing the female end of the tubular shroud relative to and on the male end of the plug body whereas unlocking and releasing of the tubular shroud from the plug body is accomplished by depressing the spring clip from the outward relaxed condition to the inward depressed condition followed by unscrewing the female end of the tubular shroud relative to and from the male end of the plug body. Depressing the spring clip is accomplished by a user applying pressure thereto separate from and independent of the user unscrewing of the tubular shroud from the plug body.

16 Claims, 4 Drawing Sheets

RELEASABLE SELF-LOCKING CLIP ARRANGEMENT INTERFACING WITH THREADED CONNECTION BETWEEN PLUG BODY AND TUBULAR SHROUD OF ELECTRICAL CONNECTOR PLUG HOUSING

BACKGROUND OF THE INVENTION

1. Field of the Invention

The present invention relates generally to electrical connector assemblies of the type having plug and receptacle components for general and hazardous industrial applications and, more particularly, is concerned with a releasable self-locking clip arrangement interfacing with a threaded connection between a plug body and tubular shroud of an electrical connector plug housing.

2. Description of the Prior Art

For many years a comprehensive selection of electrical products, namely, electrical fittings, enclosures, distribution equipment, connectors, controls and lighting fixtures, have been manufactured and sold by Killark Electric Manufacturing Company, a subsidiary of Hubbell Incorporated. These electrical products are designed for use in hazardous, hostile, corrosive and general industrial environments. More specifically, weather resistant electrical connector assemblies having plugs and receptacles are designed as general purpose equipment for use in and around industrial plants both indoors and outdoors on portable and stationary apparatuses.

In one particular design, the connector plug housing has a plug body and a tubular shroud which threadably interfits or interfaces with an end of the plug body. In many uses of this electrical connector assembly, it is highly desirable to provide a way to ensure that over time the tubular shroud does not unscrew from the plug body. Many devices are known in the prior art for locking threaded parts together. Representative of such devices are the ones disclosed in U.S. Pat. No. 1,047,542 to Lofland, U.S. Pat. No. 1,387,172 to Postel et al., U.S. Pat. No. 1,679,474 to Kenton and U.S. Pat. No. 4,053,198 to Doyle et al. None of the locking arrangements of these prior art patents, however, appear to be particularly suited for incorporation into the connector plug housing design mentioned above.

Consequently, a need exists for further improvement of the design of the aforementioned electrical connector assembly so as to attain the desired objective of releasably locking together the threadably interfaced tubular shroud and plug body of the connector plug housing.

SUMMARY OF THE INVENTION

The present invention provides a releasable self-locking clip arrangement for an electrical connector assembly which is designed to satisfy the aforementioned need. The releasable self-locking clip arrangement of the present invention is provided at a threaded connection between a plug body and a tubular shroud of a connector plug housing for the electrical connector assembly so as to accomplish locking of the tubular shroud on the plug body merely by the action of screwing the tubular shroud and plug body to one another. A separate and independent action is necessary in order to accomplish unlocking or releasing of the tubular shroud from the plug body to permit unscrewing of the parts from one another.

Accordingly, the present invention is directed to a connector plug housing for an electrical connector assembly. The connector plug housing comprises: (a) a plug body having a male end; (b) a tubular shroud having a female end adapted to be received on the male end of the plug body; (c) first and second complementary threads respectively formed on the male end of the plug body and the female end of the tubular shroud for providing a threaded connection therebetween by screwing the female end of the tubular shroud relative to and on the male end of the plug body; and (d) a releasable self-locking clip arrangement provided on the plug body and tubular shroud in an interfacing relationship with the first and second threads thereon. The self-locking clip arrangement includes an elongated resiliently deformable spring clip actuatable between an outward relaxed condition and an inward depressed condition such that locking of the tubular shroud on the plug body is accomplished solely by the screwing of the female end of the tubular shroud relative to and on the male end of the plug body whereas unlocking and releasing of the tubular shroud from the plug body is accomplished by depressing the spring clip from the outward relaxed condition to the inward depressed condition followed by unscrewing the female end of the tubular shroud relative to and from the male end of the plug body. The depressing of the spring clip is accomplished by a user applying a pressure thereto separate from and independent of the user unscrewing of the tubular shroud from the plug body.

More particularly, the first thread on the male end of the plug body and the second thread on the female end of the tubular shroud each has a leading portion and a trailing portion. The self-locking clip arrangement includes a first pocket defined on the plug body and a second pocket defined on the female end of the tubular shroud. The first pocket extends along a side of the plug body to the male end thereof and intersect with the trailing portion of the first thread on the plug body and terminates before reaching the leading portion of the first thread. The second pocket intersects only with the leading portion of the second thread on the tubular shroud. The spring clip is mounted along the side of the plug body in alignment with and normally disposed outwardly from and extending over the first pocket thereon. The spring clip is adapted to be engaged by the female end of the tubular shroud and yieldably depressed into the first pocket by screwing the female end of the tubular shroud on the male end of the plug body until the leading portion of the second thread of the tubular shroud reaches the trailing portion of the first thread on the plug body whereat the spring clip becomes aligned with and moves into the second pocket of the tubular shroud so as to lock the tubular shroud onto the plug body due to the spring clip now interfacing with the threaded connection and thereby preventing unscrewing of the tubular shroud from the plug body. The spring clip becomes aligned with and moves into the second pocket of the tubular shroud after only a single revolution of the tubular shroud on the plug body past an initial contact of leading portions of the complementary first and second threads with one another.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
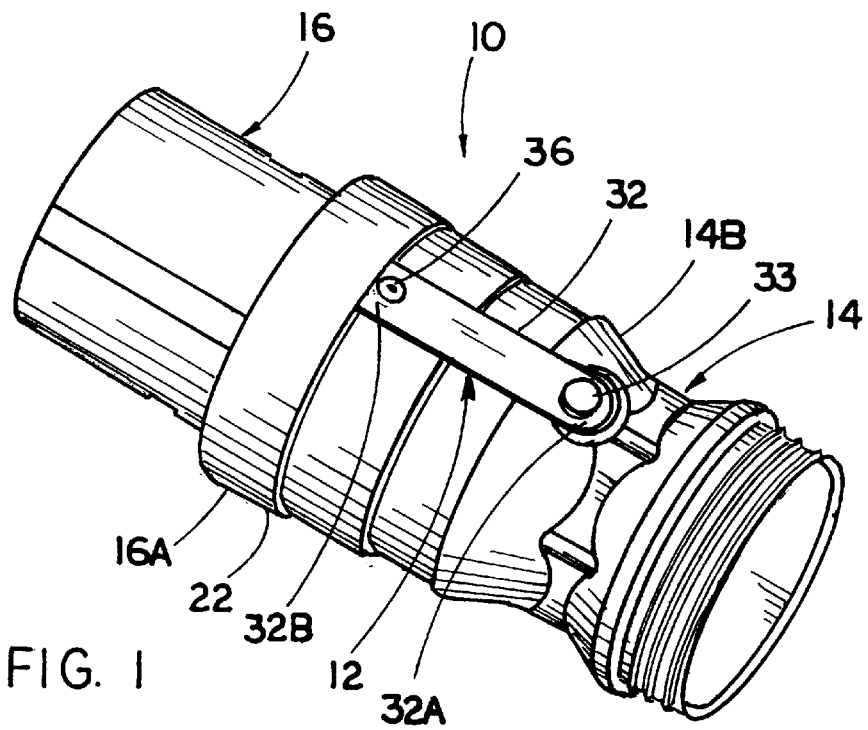
FIG. 1 is a perspective assembled view of a connector plug housing with a releasable self-locking clip arrangement of the present invention thereon.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Figure 2:
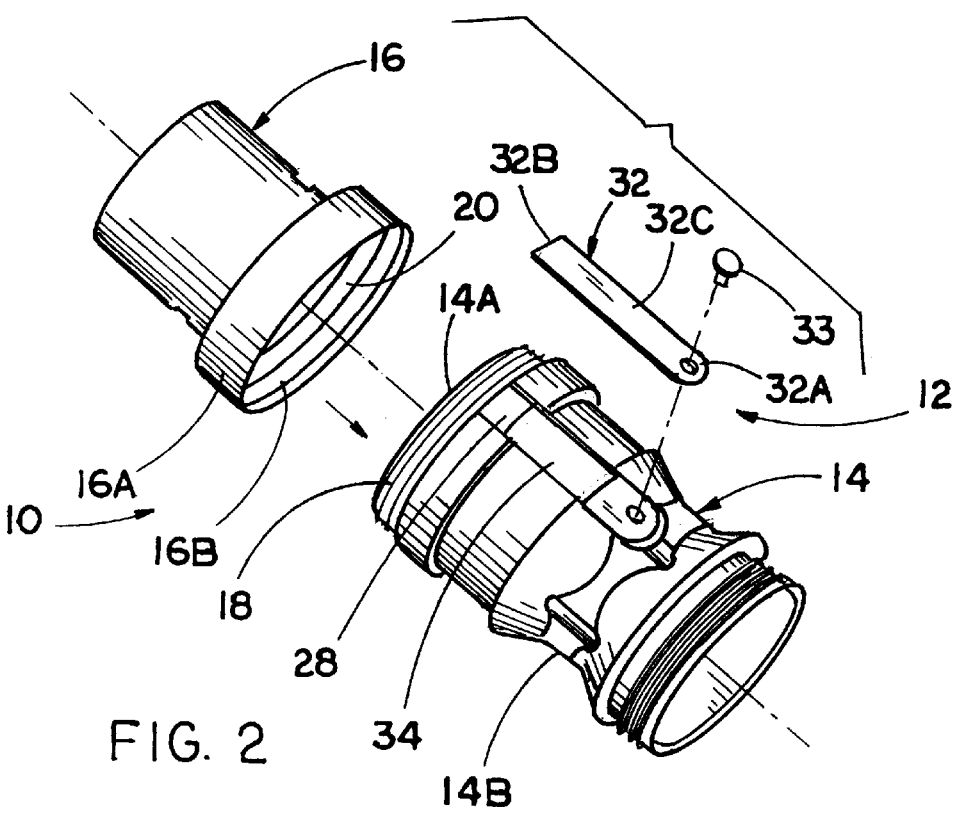
FIG. 2 is a perspective exploded view on a reduced scale of the connector plug housing and the releasable self-locking clip arrangement thereon.
Figure 4:
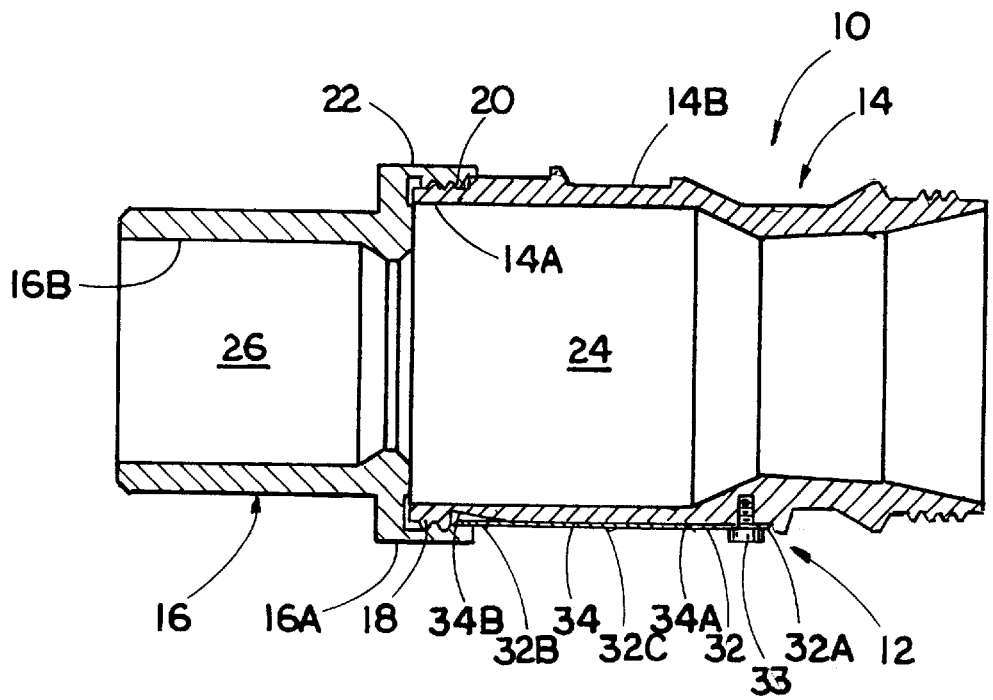
FIG. 4 is a longitudinal sectional view of the connector plug housing and self-locking clip arrangement taken along line 4—4 of FIG. 3.
Figure 3:
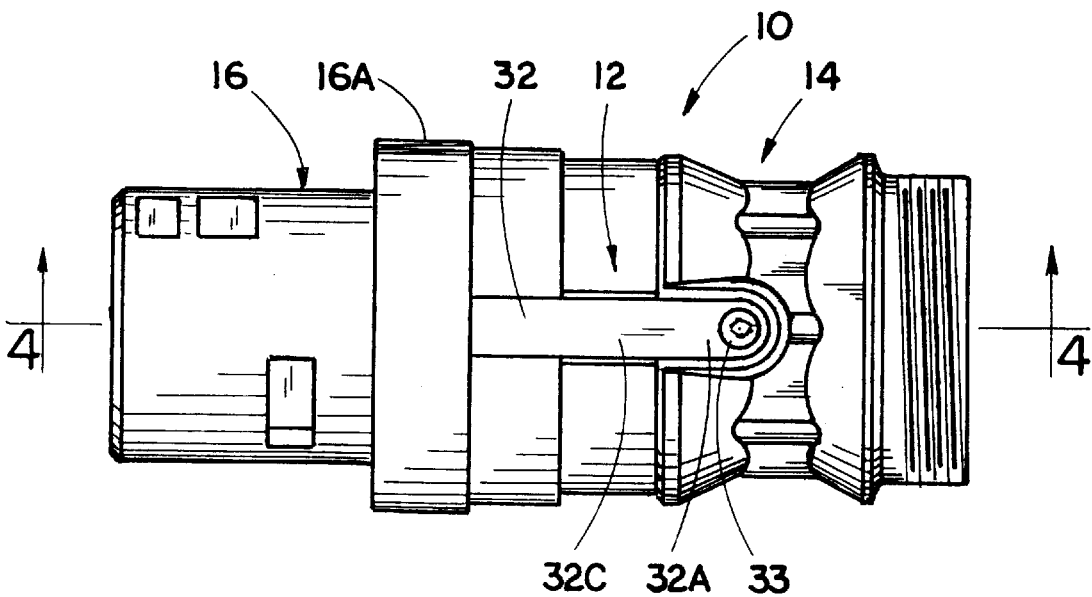
FIG. 3 is an enlarged top plan view of the connector plug housing and self-locking clip arrangement of FIG. 1.

Referring now to the drawings, and particularly to FIGS. 1–4, there is shown a connector plug housing 10 for an electrical connector assembly having thereon a releasable self-locking clip arrangement, generally designated 12, of the present invention. In addition to the releasable self-locking clip arrangement 12, the connector plug housing 10 basically includes a plug body 14 having a male end 14A, a tubular shroud 16 having a female end 16A adapted to be received on the male end 14A of the plug body 14, and first and second complementary threads 18, 20 formed respectively on the male end 14A of the plug body 14 and on the female end 16A of the tubular shroud 16. The first and second threads 18, 20 provide a threaded connection 22 between the male end 14A of the plug body 14 and the female end 16A of the tubular shroud 16 by screwing the female end 16A of the tubular shroud 16 in one direction relative to and on the male end 14A of the plug body 14. The tubular shroud 16 is disconnected from the plug body 14 by screwing the tubular shroud 16 in an opposite direction relative to the plug body 14. The releasable self-locking clip arrangement 12 has elements described below which are provided on both the plug body 14 and tubular shroud 16 in an interfacing or interfitting relationship with the first and second threads 18, 20 thereon such that releasable locking of the tubular shroud 16 on the plug body 14 is accomplished by the screwing of the tubular shroud 16 relative to and on the plug body 14.

Figure 5:
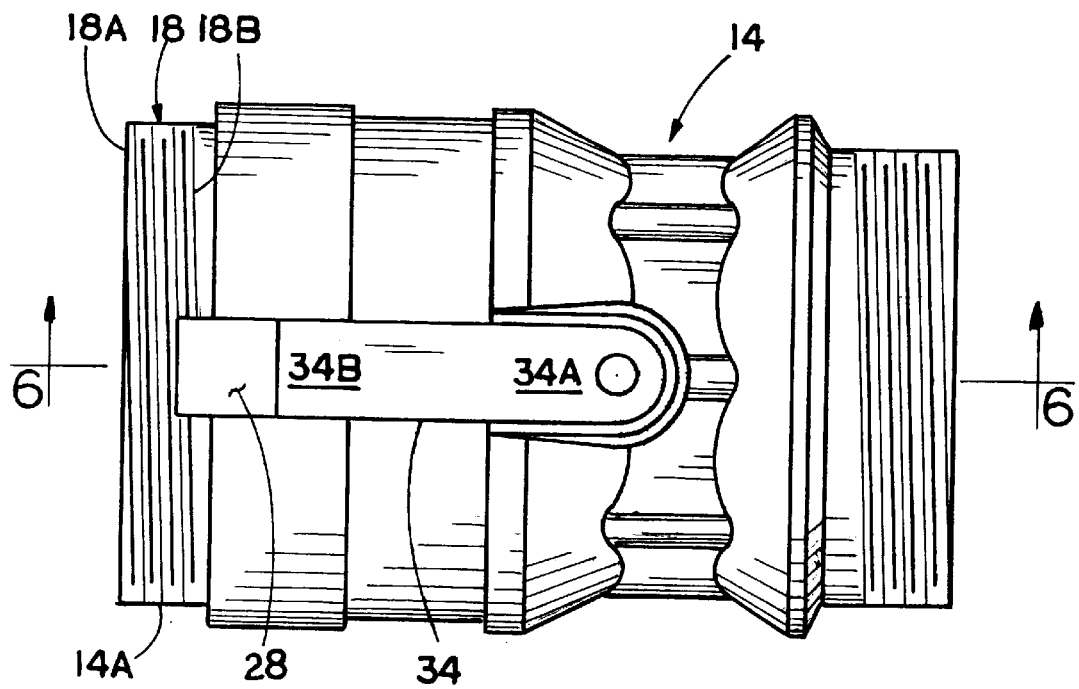
FIG. 5 is an enlarged top plan view of a plug body of the connector plug housing.
Figure 6:
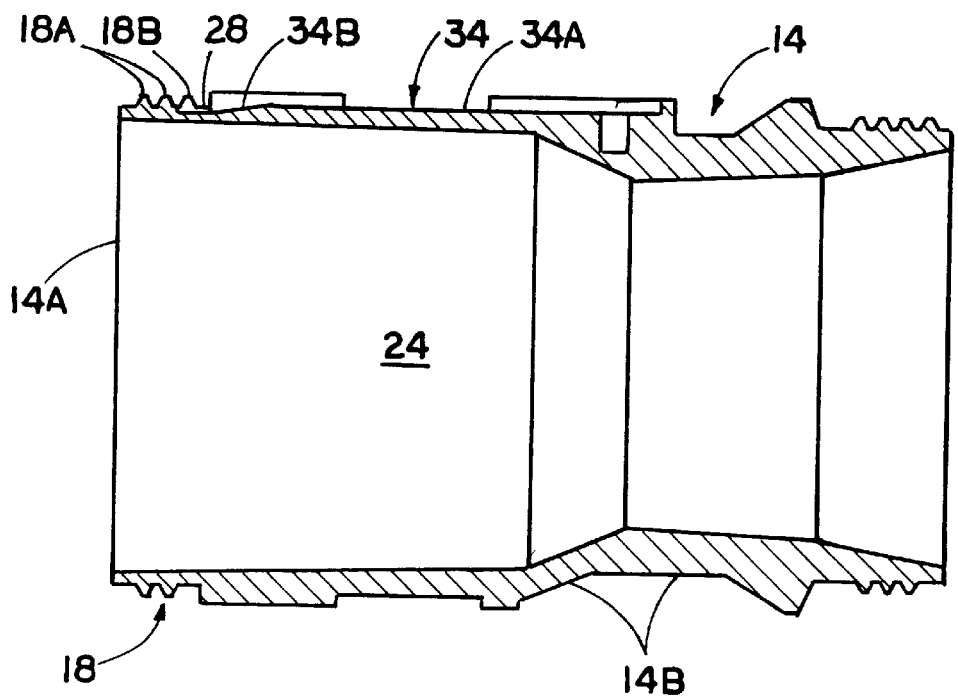
FIG. 6 is a longitudinal sectional view of the plug body taken along line 6—6 of FIG. 5.
Figure 7:
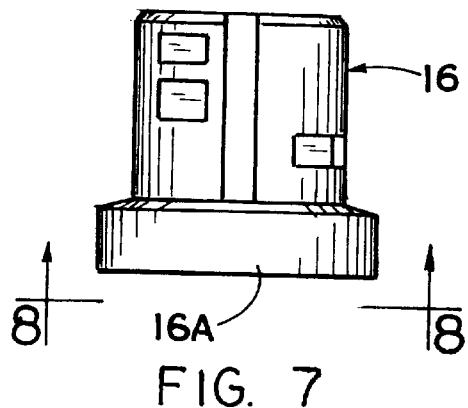
FIG. 7 is a top plan view of a tubular shroud of the connector plug housing.
Figure 8:
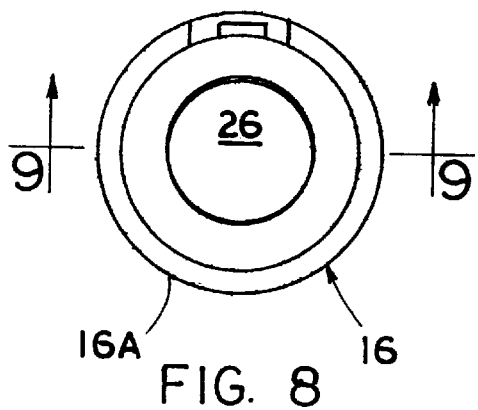
FIG. 8 is a front elevational view of the tubular shroud as seen along line 8—8 of FIG. 7.
Figure 9:
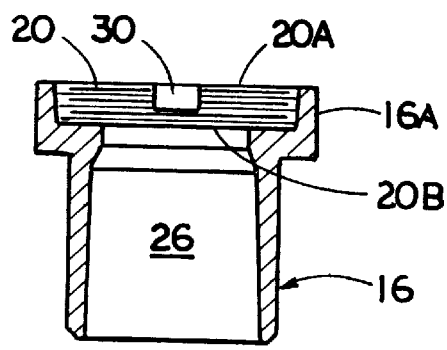
FIG. 9 is a longitudinal sectional view of the tubular shroud taken along line 9—9 of FIG. 8.

Referring now to FIGS. 1–9, both the plug body 14 and tubular shroud 16 of the connector plug housing 10 have respective rigid constructions preferably substantially cylindrical in shape defining respective central bores 24, 26 open at their opposite ends. The female end 16A of the tubular shroud 16 has a diameter which is slightly greater than that of the male end 14A of the plug body 14 for fitting the tubular shroud 16 onto the plug body 14. Various electrical components (not shown) that are well-known to persons of ordinary skill in the art are contained within the plug body 14 and tubular shroud 16 of the plug housing 10.

More particularly, the plug body 14 has an exterior surface 14B. The first thread 18 is formed on the exterior surface 14B of the plug body 14 externally about the male end 14A thereof and has a leading portion 18A and a trailing portion 18B. The tubular shroud 16 has an interior surface 16B. The second thread 20 is formed on the interior surface 16B of the tubular shroud 16 internally about the female end 16A thereof and has a leading portion 20A and a trailing portion 20B.

Figure 10:
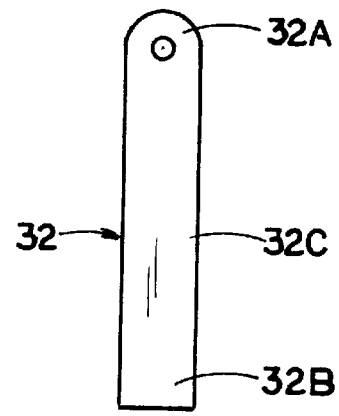
FIG. 10 is an enlarged top plan view of a spring clip of the self-locking clip arrangement.
Figure 11:
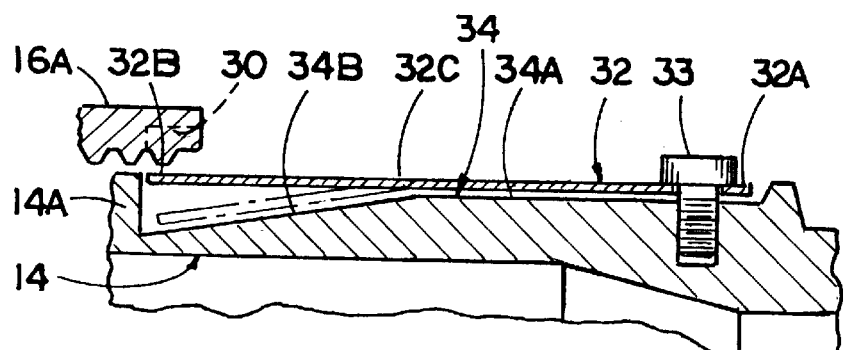
FIG. 11 is an enlarged sectional view of the portions of the plug body and tubular shroud of the connector plug housing forming elements of the self-locking clip arrangement of the present invention, the spring clip of the arrangement being shown, in full line form, in an undepressed locking condition spaced above a first pocket of a male end of the plug body and, in phantom line form, in a depressed releasing condition in the first pocket of the male end of the plug body.

Referring to FIGS. 1–11, the releasable self-locking clip arrangement 12 basically includes a first pocket 28 formed on the plug housing 14, a second pocket 30 formed on the tubular shroud 16 and an elongated resiliently bendable deformable spring clip 32 of a suitable springy metal mounted along a side of the exterior surface 14B of the plug body 14. The first pocket 28 of the arrangement 12 extends along a side of the exterior surface 14B of the plug body 14 to the male end 14A thereof. The first pocket 28 intersects with and thereby creates a discontinuity in the trailing portion 18B of the first thread 18 on the male end 14A of the plug body 14 but terminates before reaching the leading portion 18A of the first thread 18. The second pocket 30 of the arrangement 12 intersects only with and thereby creates a discontinuity in the leading portion 20A of the second thread 20 on the tubular shroud 16.

The spring clip 32 of the arrangement 12 is mounted along the side of the plug body 14 in alignment with and normally disposed outwardly from and extending over the first pocket 28 on the plug body 14. Preferably, although not necessarily, the spring clip 32 is substantially flat in shape and has a length substantially greater than a width thereof. The spring clip 32 has a pair of opposite end portions 32A, 32B. The spring clip 32 at the one end portion 32A is securely attached by a screw 33 to the plug body 14. The spring clip 32 at the other end portion 32B is free for movement into and from the respective first and second pockets 28, 30 on the plug body 14 and tubular shroud 16 between an outer, undepressed or relaxed, locking condition, as shown in full line form in FIG. 11, wherein the other end portion 32B of the spring clip 32 is spaced above the first pocket 28 of the plug body 14 and extends into the second pocket 30 of the tubular shroud 16, and an inner, depressed, releasing condition, as shown in broken line form in FIG. 11, wherein the other end portion 32B of the spring clip 32 is spaced below the second pocket 30 of the tubular shroud 16 and extends into the first pocket 28 of the plug body 14.

The other free end portion 32B of the spring clip 32 is so positioned that it is adapted to be engaged by the female end 16A of the tubular shroud 16 and yieldably deflected and depressed into the first pocket 28 of the plug body 14 to the releasing condition merely by screwing the female end 16A of the tubular shroud 16 onto the male end 14A of the plug body 14. The free end portion 32B of the spring clip 32 will remain depressed within the first pocket 28 until the leading portion 20A of the second thread 20 on the tubular shroud 16 reaches the trailing portion 18B of the first thread 18 on the plug body 14. When the leading portion 20A of the second thread 20 reaches the trailing portion 18B of the first thread 18 the second pocket 30 on the tubular shroud 16 is brought into alignment over the free end portion 32B of the spring clip 32 which then moves with a snap-like action into the second pocket 30 so as to self-lock the tubular shroud 16 onto the plug body 14 in a manner which prevents further screwing or unscrewing of the tubular shroud 16 onto or from the plug body 14. Such locking action is due to the fact that the free end portion 32B of the spring clip 32 interfaces or interfits with the threaded connection 22 provided by the meshed first and second threads 18, 20 and thereby prevents the unscrewing of the tubular shroud 16 from the plug body 14. Furthermore, the respective lengths of the leading and trailing portions 18A, 18B and 20A, 20B of the first and second threads 18, 20 are such that the spring clip 32 preferably becomes aligned with and moves into the second pocket 30 in the second thread 20 on the tubular shroud 16 after about a single revolution of the tubular shroud 16 on the plug body 14 past an initial contact of the leading portions 18A, 20A of the first and second threads 18, 20 with one another. This movement of the free end portion 32B of the spring clip 32 into the second pocket 30 in the internal second thread 20 on the female end 16A of the tubular shroud 16 may also occur after any other suitable number of revolutions of the female end 16A of the tubular shroud 16 on the male end 14A of the plug body 14.

The arrangement 12 also includes a recessed ramp 34 on the plug body 14 extending from the exterior surface 14B of the plug body 14 starting at a location spaced between and from the opposite ends thereof and into the plug body 14. The recessed ramp 34 particularly has a horizontal portion 34A and an inclined portion 34B extending from the horizontal portion 34A and merging into the first pocket 28 on the plug body 14. The spring clip 32 is mounted in the recessed ramp 34 along the side of the plug body 14 and extends at its middle portion 32C over the inclined portion 34B of the recessed ramp 34 and at its free end portion 32B over the first pocket 28.

To recapitulate, the spring clip 32 is yieldably resiliently deflectable or bendable and thus depressible into the first pocket 28 on the male end 14A of the plug body 14 by the leading portion 20A of the internal second thread 20 on the female end 16A of the tubular shroud 16 so as to permit further movement of the internal second thread 20 on the tubular shroud 16 onto the external first thread 18 on the male end 14A of the plug body 14. When brought into alignment, the depressed other end portion 32B of the spring clip 32 moves with a snap-like action back to its undepressed or relaxed condition into the second pocket 30 in the internal second thread 20 on the female end 16B of the tubular shroud 16 and thus engages the leading portion 20A of the second thread 20 so as to self-lock the female end 26 of the tubular shroud 18 onto the male end 20 of the plug body 16. The spring clip 32 is manually disengaged and removed from the second pocket 30 in the internal second thread 20 on the female end 16B of the tubular shroud 16 by a user pushing down on a target 36 on the spring clip 32 adjacent to the free end portion 32B thereof. Such depressing movement of the free end portion 32B of the spring clip 32 from the second pocket 20, in turn, causes its entry into the first pocket 28 in the male end 14A of the plug body 14 so as to thereby permit reverse unscrewing of the internal second thread 20 on the tubular shroud 16 from the external first thread 18 on the plug body 14 so as to ultimately release the tubular shroud 16 from the plug body 14. Thus, self-locking of the tubular shroud 16 on the plug body 14 is accomplished solely by screwing the female end 16A of the tubular shroud 16 relative to and on the male end 14A of the plug body 14 whereas unlocking and releasing of the tubular shroud 16 from the plug body 14 is accomplished by first depressing the spring clip 32 from the outward relaxed condition to the inward depressed condition followed by unscrewing the female end 16A of the tubular shroud 16 relative to and from the male end 14A of the plug body 14. The depressing of the spring clip 32 is accomplished by a user applying pressure thereto through an action that is separate from and independent of the user unscrewing of the tubular shroud 16 from the plug body 14.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A connector plug housing for an electrical connector assembly, said connector plug housing comprising:
    (a) a plug body having a male end;
    (b) a tubular shroud having a female end adapted to be received on said male end of said plug body;
    (c) complementary first and second threads respectively formed on said male end of said plug body and said female end of said tubular shroud for providing a threaded connection therebetween by screwing said female end of said tubular shroud relative to and on said male end of said plug body; and
    (d) an actuatable self-locking clip arrangement provided on said plug body and tubular shroud in an interfacing relationship with said complementary first and second threads thereon such that actuation of said clip arrangement from start to completion and locking of said tubular shroud on said plug body are accomplished solely by said screwing said female end of said tubular shroud relative to and on said male end of said plug body.

2. The connector plug housing as recited in claim 1, wherein:
    said first thread on said male end of said plug body has a leading portion and a trailing portion; and
    said self-locking clip arrangement includes a first pocket defined on said plug body so as to extend along a side of said plug body to said male end thereof and intersect with said trailing portion of said first thread on said plug body and terminate before reaching said leading portion of said first thread on said plug body.

3. The connector plug housing as recited in claim 2, wherein:
    said second thread on said female end of said tubular shroud has a leading portion and a trailing portion; and
    said self-locking clip arrangement further includes a second pocket defined on said female end of said tubular shroud so as to intersect only with said leading portion of said second thread on said tubular shroud.

4. The connector plug housing as recited in claim 3, wherein said self-locking clip arrangement further includes an elongated resiliently deformable spring clip mounted along said side of said plug body in alignment with and normally disposed outwardly from and extending over said first pocket thereon, said spring clip adapted to be engaged by said female end of said tubular shroud and yieldably depressed into said first pocket by said screwing of said female end of said tubular shroud on said male end of said plug body until said leading portion of said second thread on said tubular shroud reaches said trailing portion of said first thread on said plug body whereat said spring clip becomes aligned with and moves into said second pocket of said tubular shroud so as to lock said tubular shroud onto said plug body due to said spring clip interfacing with said threaded connection and thereby prevent unscrewing said tubular shroud from said plug body.

5. The connector plug housing as recited in claim 4, wherein said spring clip becomes aligned with and moves into said second pocket of said tubular shroud after only a single revolution of said tubular shroud on said plug body past an initial contact of said leading portions of said complementary first and second threads with one another.

6. The connector plug housing as recited in claim 4, wherein said spring clip is substantially flat and has a length substantially greater than a width thereof.

7. The connector plug housing as recited in claim 4, wherein said spring clip has a pair of opposite end portions, said spring clip at one of said opposite end portions being attached to said plug body, said spring clip at the other of said opposite end portions being free for movement into and from said respective first and second pockets of said plug body and tubular shroud.

8. The connector plug housing as recited in claim 7, wherein said plug body also has a recessed ramp extending from an external surface of said plug body into said plug body and merging with said first pocket thereof for receiving a middle portion of said spring clip extending between said opposite end portions thereof when said other end portion of said spring clip is depressed into said first pocket.

9. A connector plug housing for an electrical connector assembly, said connector plug housing comprising:

(a) a plug body having a male end;

(b) a tubular shroud having a female end adapted to be received on said male end of said plug body;

(c) complementary first and second threads respectively formed on said male end of said plug body and said female end of said tubular shroud for providing a threaded connection therebetween by screwing said female end of said tubular shroud relative to and on said male end of said plug body; and (d) a releasable self-locking clip arrangement provided on said plug body and tubular shroud in an interfacing relationship with said complementary first and second threads thereon, said self-locking clip arrangement including an elongated resiliently deformable spring clip actuatable between an outward relaxed condition and an inward depressed condition such that actuation of said spring clip from start to completion and locking of said tubular shroud on said plug body are accomplished solely by said screwing said female end of said tubular shroud relative to and on said male end of said plug body whereas unlocking and releasing of said tubular shroud from said plug body is accomplished by depressing said spring clip from said outward relaxed condition to said inward depressed condition followed by unscrewing said female end of said tubular shroud relative to and from said male end of said plug body, said depressing of said spring clip being accomplished by a user applying pressure thereto separate from and independent of the user unscrewing of said tubular shroud from said plug body.

10. The connector plug housing as recited in claim 9, wherein:

said first thread on said male end of said plug body has a leading portion and a trailing portion; and said self-locking clip arrangement includes a first pocket defined on said plug body so as to extend along a side of said plug body to said male end thereof and intersect with said trailing portion of said first thread on said plug body and terminate before reaching said leading portion of said first thread on said plug body.

11. The connector plug housing as recited in claim 10, wherein:

said second thread on said female end of said tubular shroud has a leading portion and a trailing portion; and said self-locking clip arrangement further includes a second pocket defined on said female end of said tubular shroud so as to intersect only with said leading portion of said second thread on said tubular shroud.

12. The connector plug housing as recited in claim 11, wherein said spring clip is mounted along said side of said plug body in alignment with and normally disposed outwardly from and extending over said first pocket thereon, said spring clip adapted to be engaged by said female end of said tubular shroud and yieldably depressed into said first pocket by said screwing of said female end of said tubular shroud on said male end of said plug body until said leading portion of said second thread on said tubular shroud reaches said trailing portion of said first thread on said plug body whereat said spring clip becomes aligned with and moves into said second pocket of said tubular shroud so as to lock said tubular shroud onto said plug body due to said spring clip interfacing with said threaded connection and thereby prevent unscrewing of said tubular shroud from said plug body.

13. The connector plug housing as recited in claim 12, wherein said spring clip becomes aligned with and moves into said second pocket of said tubular shroud after only a single revolution of said tubular shroud on said plug body past an initial contact of said leading portions of said complementary first and second threads with one another.

14. The connector plug housing as recited in claim 12, wherein said spring clip is substantially flat and has a length substantially greater than a width thereof.

15. The connector plug housing as recited in claim 12, wherein said spring clip has a pair of opposite end portions, said spring clip at one of said opposite end portions being attached to said plug body, said spring clip at the other of said opposite end portions being free for movement into and from said respective first and second pockets of said plug body and tubular shroud.

16. The connector plug housing as recited in claim 15, wherein said plug body also has a recessed ramp extending from an external surface of said plug body into said plug body and merging with said first pocket thereof for receiving a middle portion of said spring clip extending between said opposite end portions thereof when said other end portion of said spring clip is depressed into said first pocket.

* * * * *